No. 820,916. PATENTED MAY 15, 1906.
C. COULERU-MEURI.
SPEED INDICATOR FOR VEHICLES, &c.
APPLICATION FILED OCT. 6, 1904.

2 SHEETS—SHEET 1.

WITNESSES
Paul A. Blair
Walter Abbe

INVENTOR
Charles Couleru-Meuri
BY
Howson and Howson
ATTORNEYS

No. 820,916. PATENTED MAY 15, 1906.
C. COULERU-MEURI.
SPEED INDICATOR FOR VEHICLES, &c.
APPLICATION FILED OCT. 6, 1904.

2 SHEETS—SHEET 2.

WITNESSES
Paul A Blair
Walter Abbe

INVENTOR
Charles Couleru-Meuri
BY
Howson and Howson
ATTORNEYS

UNITED STATES PATENT OFFICE.

CHARLES COULERU-MEURI, OF LA CHAUX-DE-FONDS, SWITZERLAND, ASSIGNOR TO FLORY, REINGPACH & CO., OF COLCHESTER, ENGLAND.

SPEED-INDICATOR FOR VEHICLES, &c.

No. 820,916.	Specification of Letters Patent.	Patented May 15, 1906.

Application filed October 6, 1904. Serial No. 227,421.

*To all whom it may concern:*

Be it known that I, CHARLES COULERU-MEURI, a citizen of Switzerland, residing at La Chaux-de-Fonds, Canton of Neuchâtel, Switzerland, have invented new and useful Improvements in a Speed-Indicator for Vehicles of all Kinds, of which the following is a specification.

The object of this invention is to provide a speed-indicating apparatus for vehicles—such as bicycles, automobiles, locomotives, and the like—the said apparatus comprising an index-finger operated by gearing from one of the wheels of the vehicle during definite periods of time governed by a notched disk operated by clockwork and a spring-actuated detent engaging the said notched disk, the notched disk being released and the index-finger being returned to zero by means of a spring-actuated toothed segment in gear with a pinion in connection with the index-finger.

Figure 1:
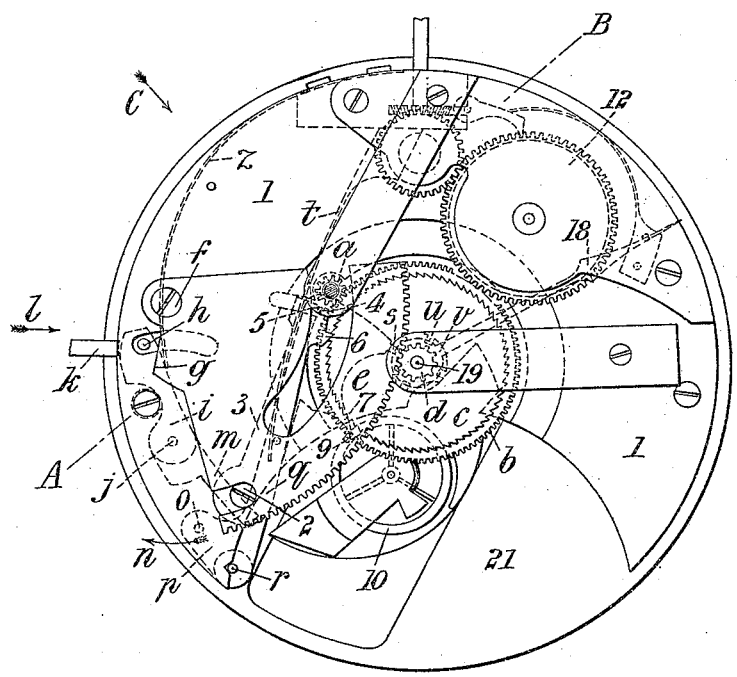
Figure 3:
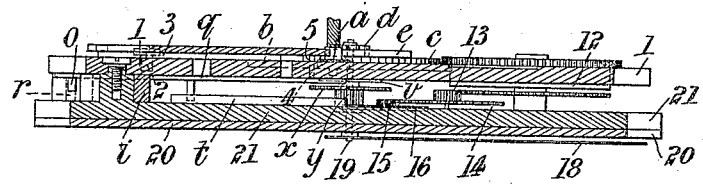
Figures 2, 4:
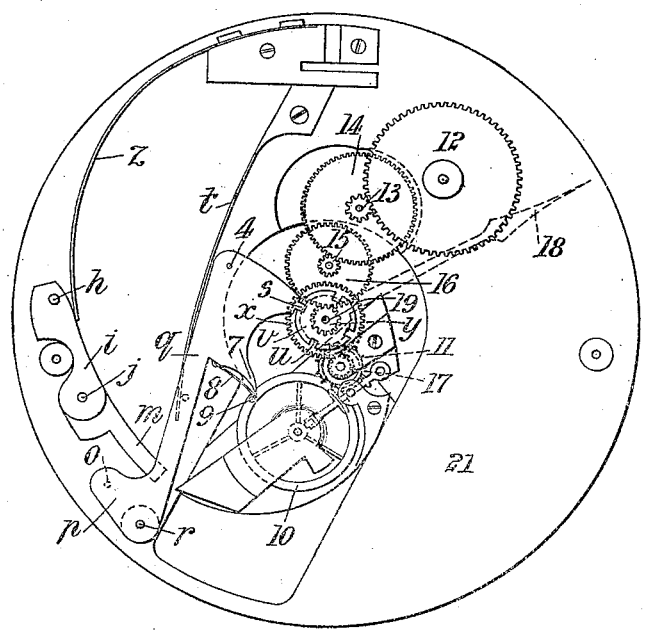

Figure 1 of the accompanying drawings is a plan of a speed-indicator constructed according to my invention, the casing thereof being removed. Fig. 2 is a view similar to Fig. 1 with one of the bearing-plates and part of the mechanism removed to show more clearly the clockwork stop mechanism. Fig. 3 is a section on the line A B, Fig. 1, viewed in the direction of the arrow C; and Fig. 4 is a face view of the apparatus drawn to a smaller scale, showing the dial and index-finger at zero.

$a$ is a pinion mounted on a spindle which may be rotated by any suitable means—for instance, by a flexible member, such as a small metallic endless cable—from one of the wheels of the vehicle. The pinion $a$ gears with a wheel $b$, which is loosely mounted on the spindle 19 and continually rotates in a contra-clockwise direction. Having one of its sides in frictional engagement with this wheel $b$ is a ratchet-wheel $c$, which is fast on the spindle 19 and rotates only when released, as hereinafter more fully described. This spindle 19 also carries the index-pointer 18, which revolves with the ratchet-wheel $c$. This pointer 18 when released rotates only a predetermined period of time and indicates on the dial 20 a speed proportional to the average speed of the vehicle for that time—that is, the pointer would indicate on the dial in the predetermined time (fifteen seconds in this case) the number of miles per hour at which the vehicle was traveling at that time. A smaller pinion $d$ is also fast to the spindle 19 and gears with a toothed sector $e$, pivoted at $f$ to the bearing-plate 1 and having a heel or flat part $g$, against which a pin or projection $h$ is caused to act. The pin $h$ is attached to one end of a lever $i$, pivoted at $j$ to the bearing-plate 21.

Pressure may be exerted in the direction of the arrow $l$ on the lever $i$ by means of a push $k$ to cause the other end $m$ of this lever to move in the direction of the arrow $n$ and come into contact with a pin or stud $o$ on the shorter arm $p$ of a bent lever $q$, pivoted at $r$ to the plate 21 and terminating at the upper end of the longer arm in a finger $s$, which is constantly urged by a spring $t$ to enter one of the four notches $u$, provided in the periphery of a disk $v$, integral with and mounted on the same spindle as a wheel $x$ and a pinion $y$. A spring $z$ presses against the lever $i$ in a direction opposite to that of the arrow $l$.

On the plate 1 is pivoted at 2 an arm 3, connected with the lever $q$ by means of a pin 4, attached to the said lever $q$. The pin 4 projects through an opening in the plate 1 and engages with a notch 5, provided in the top of the arm 3. The arm 3 is provided at the top with a nose or projection 6, capable of engaging with the teeth of the ratchet-wheel $c$. The arm $q$ is provided with a shoulder 7, to which is fixed a thin blade-spring 8, Fig. 2, with which a pin or stud 9 on the balance-wheel 10 of the clockwork can come into contact to stop the clock.

The scape-wheel 11 is operated from a spring-barrel 12 through a train of wheels 13, 14, 15, 16 $yx$ and 17, 17, being a pinion on the same arbor as and integral with the scape-wheel 11.

The diameter of the vehicle-wheel which drives the pinion $a$ being known, the ratio of the wheel-gearing is calculated according to the divisions on the dial. The spring-barrel 12 being wound up and the index-finger 18 stationary at any division of the dial, the working of the apparatus is as follows:

So long as no pressure is exerted on the push $k$ the wheel $b$, which is operated by the pinion $a$, rotates on the arbor 19, the clockwork being held stationary, first, by the blade-spring 8 bearing against the pin or stud 9 on the balance-wheel 10; secondly, by the nose or projection 6 of the lever $q$ engaging the teeth of the ratchet-wheel c, and, lastly, by the finger s on the arm 3 engaging one of the four notches u of the disk v.

If it be desired to ascertain the speed at which the vehicle fitted with the apparatus is running, the push k is pressed in the direction of the arrow l. The sector e then under the action of the pin or projection h rotates the pinion d, and with it the arbor 19 and index-finger 18, bringing the said index-finger to position of zero on the dial, as shown in Fig. 4. At the same time the lower end m of the lever i, acting on the pin or stud o, causes the bent lever q and arm 3 to move and disengage the nose 6 from the teeth of the wheel c, the fingers s from the notch u in the disk v, which is controlled by the clock mechanism, to receive one complete revolution in a minute, and remove the spring 8 away from the stud 9 on the balance-wheel, so that the clockwork is at once set in motion, whereby the index-finger 18 is driven by the pinion a and the wheel b, which is in frictional engagement with the ratchet-wheel c, until a notch u in the disk v is again engaged by the finger s. The push k is released as soon as the index-finger 18 comes to the zero position on the dial, whereupon the lever i returns to its original position, and under the action of the spring t the finger s of the arm 3 bears on the disk v, but without being able to enter the notch u, because the disk has in the meantime been set in motion by the clockwork. The finger s will therefore remain in contact with the periphery of the disk v and keep the nose 6 at a slight distance from the teeth of the ratchet-wheel c and the blade-spring 8 out of the path described by the pin or stud 9 on the balance-wheel until the disk v has made a quarter of a rotation, which occupies exactly fifteen seconds, when the next notch u in the periphery of the disk will be opposite the finger s, which finger will enter therein, and the nose 6 on the lever q will engage with one of the teeth of the wheel c and immediately stop the index-finger 18 and the blade-spring 8, at the same time coming into the path of the pin or stud 9 on the balance-wheel and stop the clock. During the fifteen seconds the clockwork was working the index-finger 18 will have moved over the dial 20 to an extent proportional to the speed at which the vehicle is running. The divisions of the dial being established according to the diameter of the vehicle-wheel and the intermediate wheels between this vehicle-wheel and the wheel d, driving the index-finger, the speed at which the vehicle is traveling is at once obtained by observing the division of the dial at which the index-finger stops.

It is obvious that the wheel d, which drives the index-finger, could be driven from one of the vehicle-wheels in any other suitable manner and that the dial could be divided otherwise than as shown, providing the divisions be always equal, the ratio between the vehicle-wheel driving the apparatus and the wheel a operating the apparatus being chosen in each case according to the kind of divisions on the dial. The unit of length for the road traversed by the vehicle may be an English mile, a kilometer, or the like. The duration of the working of the clockwork may be other than fifteen seconds, as hereinbefore described. The ratio between the movement of the index-finger and the driving-wheel being arranged accordingly, and the mechanism before described for starting the clockwork, as well as that of the index-finger, may be different from that shown. Means may be provided for automatically starting the clockwork by the motion of the vehicle instead of by the push k in the arrangement shown.

This apparatus may be of about the size of a watch of average size and be inclosed in a casing having the appearance of an ordinary watch and may be carried on a suitable bracket fixed on the vehicle—for instance, on the steering-handle of a bicycle or other vehicle.

The apparatus may be made of a larger size for use with (for example) motor-cars, locomotives, or the like.

I claim as my invention—

1. A speed-indicator for vehicles adapted to be operated during a definite period of time and proportional to the average speed of the vehicle for that time, means adapted to be connected to a wheel of the vehicle for actuating the indicator mechanism, an index-finger, a sector for returning said index-finger to zero, locking devices for the index-finger and indicator mechanism, means for releasing said locking devices, and a spring-actuated lever adapted to again bring said locking devices into engagement after a definite period of time.

2. A speed-indicator for vehicles adapted to be operated during a definite period of time and proportional to the average speed of the vehicle for that time, means adapted to be connected to a wheel of the vehicle for actuating the indicator mechanism, an index-finger, a sector for returning said index-finger to zero, locking devices for the indicator mechanism, a pivoted spring-actuated lever for releasing said locking device, clockwork for operating the indicator for a definite interval of time and means for again locking the indicator mechanism at the completion of the time.

3. A speed-indicator for vehicles adapted to be operated during a definite period of time and proportional to the average speed of the vehicle for that time, means adapted to be connected to a wheel of the vehicle for actuating the indicator mechanism, an index-finger, a notched wheel movable therewith, a sector for returning said index-finger to zero, locking devices for the indicator mechanism, comprising a toothed lever engaging said notched wheel controlling said index-finger, and means for releasing said locking devices and bringing them into engagement after a definite interval of time.

4. A speed-indicator for vehicles of the character described, having means adapted to be connected to a wheel of the vehicle, an index-pointer operated thereby for showing the speed at which the vehicle is moving, locking means for said pointer, and a push-pin under control of the operator for releasing the locking means putting said indicator device into operation at any moment, and a sector also operated by said pin for resetting the indicator to zero before the device is started.

5. A speed-indicator for vehicles adapted to be operated during a definite period of time and proportional to the average speed of the vehicle for that time, said indicator comprising driving means, a dial and index-finger, and means in frictional engagement with said driving means for operating said index-finger.

6. A speed-indicator for vehicles adapted to be operated during a definite period of time and proportional to the average speed of the vehicle for that time, said indicator comprising driving means, a dial and index-finger, and a ratchet-wheel in frictional engagement with said driving means for operating said index-finger, in combination with a locking device for holding said ratchet-wheel from rotating when the indicator is not in use.

7. A speed-indicator for vehicles adapted to be operated during a definite period of time and proportional to the average speed of the vehicle for that time, said indicator comprising an indicating mechanism, means for operating said indicating mechanism, and means for locking said mechanism against rotation in combination with clockwork for limiting the period of operation, a locking device therefor, and means for starting said clockwork after resetting the indicating mechanism to zero.

8. A speed-indicator for vehicles adapted to be operated during a definite period of time and proportional to the average speed of the vehicle for that time, said indicator comprising an indicating mechanism, means for operating said indicating mechanism, and means for locking said mechanism against rotation in combination with clockwork for limiting the period of operation, and means for turning the indicating mechanism to zero before the clockwork is started.

9. A speed-indicator for vehicles adapted to be operated during a definite period of time and proportional to the average speed of the vehicle for that time, said indicator comprising an indicating mechanism, means for operating said indicating mechanism, and means for locking said mechanism against rotation in combination with means for turning said indicating mechanism to zero before unlocking the same.

10. A speed-indicator for vehicles adapted to be operated during a definite period of time and proportional to the average speed of the vehicle for that time, said indicator comprising an indicating mechanism, means for operating said indicating mechanism, and means for locking said mechanism against rotation in combination with clockwork for limiting the period of operation, and means for putting said clockwork and indicating mechanism into operation at the same time.

11. A speed-indicator for vehicles adapted to be operated during a definite period of time, and proportional to the average speed of the vehicle for that time, said indicator comprising an indicating mechanism, means for operating said indicating mechanism, and means for locking said mechanism against rotation in combination with clockwork for limiting the period of operation, and means for turning the indicating mechanism to zero before the indicating mechanism and clockwork are put into actual operation.

12. A speed-indicator for vehicles adapted to be operated during a definite period of time, and proportional to the average speed of the vehicle for that time, said indicator comprising a dial and an index-finger, in combination with means for retaining the index-finger in its final position at the end of the definite period of time and means under the control of the operator for returning said index-finger to zero before each operation.

13. The combination of an indicator and a driving means adapted to be actuated from the wheel of a vehicle, with a locking means for the indicator and means under the control of the operator to free the locking device, and a clockwork to determine the reëngagement of the locking device.

14. The combination of an indicator and a driving means adapted to be actuated from the wheel of a vehicle, and a frictional connection between the two, with a locking means for the indicator, and means under the control of the operator to free the locking device, and a clockwork to determine the reëngagement of the locking device.

In testimony whereof I have signed my name to this specification in the presence of two subscribing witnesses.

CHARLES COULERU-MEURI.

Witnesses:
ARMAND TERRELET,
ADRIEN HUGUENIN.